US012500049B2

(12) United States Patent
Fonseca et al.

(10) Patent No.: US 12,500,049 B2
(45) Date of Patent: Dec. 16, 2025

(54) EMULATED VOLTAGE-FREE SAFETY CONTACT

(71) Applicant: Televic Rail NV, Izegem (BE)

(72) Inventors: Alexandre Fonseca, Tourcoing (FR); Bram Baert, Hooglede (BE)

(73) Assignee: Televic Rail NV, Izegem (BE)

( * ) Notice: Subject to any disclaimer, the term of this patent is extended or adjusted under 35 U.S.C. 154(b) by 21 days.

(21) Appl. No.: 18/580,935

(22) PCT Filed: Aug. 1, 2022

(86) PCT No.: PCT/EP2022/071530
§ 371 (c)(1),
(2) Date: Jan. 19, 2024

(87) PCT Pub. No.: WO2023/007030
PCT Pub. Date: Feb. 2, 2023

(65) Prior Publication Data

US 2024/0274378 A1 Aug. 15, 2024

(30) Foreign Application Priority Data

Jul. 30, 2021 (EP) ..................................... 21188867

(51) Int. Cl.
*H01H 47/00* (2006.01)
*H01H 9/16* (2006.01)
*H01H 9/54* (2006.01)

(52) U.S. Cl.
CPC ............ *H01H 9/167* (2013.01); *H01H 9/541* (2013.01); *H01H 47/002* (2013.01)

(58) Field of Classification Search
CPC ...... H01H 9/167; H01H 9/541; H01H 47/002; H01H 47/00; H01H 9/16; H01H 9/54;
(Continued)

(56) References Cited

U.S. PATENT DOCUMENTS

2010/0256843 A1* 10/2010 Bergstein ................ B61L 27/16 701/19
2020/0366078 A1* 11/2020 Telefus .................. H02H 3/044

FOREIGN PATENT DOCUMENTS

WO 2010031570 A1 3/2010
WO WO2010031570 * 3/2010

OTHER PUBLICATIONS

Extended European Search Report from EP Application No. 21188867.2 (filed Jul. 30, 2021), mailed Jan. 28, 2022.
(Continued)

*Primary Examiner* — Rexford N Barnie
*Assistant Examiner* — Xuan Ly

(57) ABSTRACT

The present invention concerns a safety contact for a safety line in a train, the safety contact comprising a controller and a safety switch circuit, wherein the controller comprises a sensor input for receiving signals indicating failure, wherein the safety contact comprises an input for a safety line input signal, which input is operably connected to the controller, whereby the controller is configured to receive a control signal representing a safety line state which is dependent on the safety line input signal received at the input, wherein the safety switch circuit comprises a set of at least one safety switch, the safety switch being positioned between a power supply and an output, wherein the controller is configured to: upon receiving a control signal indicating a working safety line state and a sensor input value representing no safety function failure, close said safety switch of the safety line circuit, thereby putting an output signal on the output, the output signal indicating a working safety line state, and upon receiving a control signal indicating a non-working safety line state or a sensor input value representing a safety function failure, open said safety switch of the safety line circuit, thereby essentially interrupting the safety line.

20 Claims, 7 Drawing Sheets

(58) Field of Classification Search
CPC ............. B61L 15/0081; B61L 15/0036; B61L 15/0063; B61L 15/0072; B61L 15/0009
USPC .......................................................... 307/125
See application file for complete search history.

(56) References Cited

OTHER PUBLICATIONS

International Search Report and Written Opinion from PCT Application No. PCT/EP2022/071530 (filed Aug. 1, 2022), mailed Nov. 23, 2022.

* cited by examiner

EMULATED VOLTAGE-FREE SAFETY CONTACT

TECHNICAL FIELD

The present invention relates to a safety contact which can be used on a safety line such as can be used on a train consisting of one or more carriages. The safety contact hereby is designed to interrupt the safety line in case of a failure indication.

BACKGROUND

Trains consisting of multiple carriages typically have a safety line running from the first carriage to the last carriage or vice versa. Hereby, each carriage may have one or more safety contacts which are designed to interrupt the safety line in case of a failure. For instance, a safety contact could receive input from a sensor placed on a door of a carriage, the sensor being configured to give a signal when the door does not close when requested. Consequently, the input signal from the sensor can be used as an indication for the safety contact to interrupt the safety line. The driver of the train, positioned in the first carriage, may then see or hear an alarm signal due to the interruption of the safety line. Basically, the safety line is one of the major safety components in a train, and one must make sure that failure of the safety line itself is avoided, or at least is indicated as soon as it occurs.

An example of a system which includes such a safety line for a rail vehicle is disclosed in international application WO 2010/031570 A1. This application discloses a distributed safety monitoring system provided with a first safety loop for connecting safety relays in series to a common power supply. The opening of any one of the safety relays can be detected by a current detector located in the safety loop. Each safety relay is part of a local safety monitoring device, which is provided with a local power supply and a test circuit, to allow local testing of the safety relay independently from the common power supply. Hence, the safety relays can be tested simultaneously.

However, there is a problem when using electrical relays as switches in the safety line, because they are sensitive to vibrations. Hence, when they are applied for instance on a bogie, or on another component of a railway vehicle, they could actually interrupt the safety line due to vibrations, and not due to a failure. Hence the use of solid state switches can be preferred, i.e. switches without moving parts. The above mentioned international application discloses the solid state switches which have a significant voltage drop across the switch, e.g. opto-coupled switches. Consequently, there is a limit to the amount of switches that can be placed in series in the safety line. It should be clear that this is not an optimal solution, particularly not for large trains.

The present invention aims to provide a safety contact, which can be completely implemented using solid state technology, i.e. electronics without moving parts, and without limitation as to the amount of switches in the safety line. As a result, the amount of safety contacts which are put in series on the safety line, can be very large.

SUMMARY OF THE INVENTION

The present invention relates to a safety contact for a safety line in a train, the safety contact comprising a controller and a safety switch circuit, wherein the controller comprises a sensor input for receiving signals indicating a safety function failure, wherein the safety contact comprises an input for a safety line input signal, which input is operably connected to the controller, whereby the controller is configured to receive a control signal representing a safety line state which is dependent on the safety line input signal received at the input, wherein the safety switch circuit comprises a set of at least one safety switch, the safety switch being positioned between a power supply and an output, wherein the controller is configured to:

- upon receiving a control signal indicating a working safety line state and a sensor input value representing no safety function failure, close said safety switch of the safety line circuit, thereby putting an output signal on the output, the output signal indicating a working safety line state, and
- upon receiving a control signal indicating a non-working safety line state or a sensor input value representing a safety function failure, open said safety switch of the safety line circuit, thereby essentially interrupting the safety line.

Preferably, the safety contact further comprises a safety line state detector, wherein safety line state detector comprises said input for the safety line input signal, and wherein the input is operably connected to the controller via the safety line state detector, whereby the safety line state detector comprises a control signal output, said safety line state detector being configured to provide the controller with a control signal via said control signal output representing a safety line state which is dependent on the safety line input signal received at the input.

The safety line state detector may be comprised in the controller.

The controller comprises a control signal output configured for controlling the safety switch circuit. The safety switch circuit comprises a set of at least one safety switch controlled by the control signal output of the controller, the safety switch being positioned between a power supply and an output. As such, the output signal at the output can be controlled by the controller. The controller is configured, preferably during an operational phase of the safety contact, to:

- upon receiving a control signal indicating a working safety line state and a sensor input value representing no safety function failure, close said safety switch of the safety line circuit, thereby putting an output signal on the output, the output signal indicating a working safety line state, and
- upon receiving a control signal indicating a non-working safety line state or a sensor input value representing a safety function failure, open said safety switch of the safety line circuit, thereby essentially interrupting the safety line.

Because the output of the safety switch circuit is connected to the power supply in case of a working safety line state, there are no additive voltage drops when using many safety contacts in series on the safety line, i.e. the output signal for each safety contact in the safety line is typically the voltage provided by the power supply, with a small voltage drop due to the safety switch circuit. Hence, when the safety switch is closed, the output of the safety switch circuit is essentially connected to the power supply, thus putting an output signal on the output indicating a working safety line state.

In the preferred embodiment of the invention, the safety switch circuit comprises at least two safety switches in series between the power supply and the output. Each of the at least two safety switches is operably connected to the controller, whereby the controller is configured, to:

upon receiving a control signal indicating a working safety line state and a sensor input value representing no safety function failure, close each safety switch of the safety switch circuit, thereby putting an output signal on the output, the output signal indicating a working safety line state, and upon receiving a control signal indicating a non-working safety line state or a sensor input value representing a safety function failure, open each safety switch of the safety line circuit, thereby essentially interrupting the safety line.

Hence, when each of the at least two safety switches is closed, the output of the safety switch circuit is essentially connected to the power supply, thus putting an output signal on the output indicating a working safety line state.

The presence of two safety switches, and optionally even more than two safety switches in series, reduces the risk of a failing safety contact. For instance, a single point of failure such as a short circuited switch, does not lead to a failing safety contact, i.e. a safety contact that falsely puts a voltage on the output of the safety contact. In a particularly preferred embodiment, the safety switch circuit comprises a feedback logic circuit for each of the at least two safety switches, each feedback logic circuit operably connected to the controller, for providing the controller with a signal indicative of the signal on the safety line after each safety switch. As such, the controller is allowed to, and preferably is configured to, check after each safety switch, if the signal on the safety line corresponds to the expected signal. Hereby, in case of failure of one of the safety switches, the controller is capable of identifying which safety switch is failing, thereby avoiding dormant failures.

In an embodiment, the safety contact is unidirectional. However, in a preferred embodiment, the safety contact is bi-directional. In case the safety contact of the present invention is implanted in a safety line, e.g. of a train, it may not be certain up front in which direction the safety line is configured to operate. In such cases it is preferred to use a bidirectional safety contact. For example, a train may be operated from both sides of the train, and thus the active driver cabinet ("cab") is determined by where the driver of the train is seated which is typically the front carriage. The non-active cab, where the power supply can be connected to the safety line, is then at the opposite side of the train, typically the back carriage of the train. In practice, the driver may insert and switch a driver key. Hereby, typically a power voltage is put on the safety line at the side of the non-active cab.

In an embodiment, a bidirectional safety contact may comprise two unidirectional safety contacts, one arranged for each direction. Hereby, the safety contacts may be implemented separated. The safety contacts may hereby also preferably comprise a unidirectional pass-through subcircuit at the input of the safety line state detector and/or at the output of the safety switch circuit. This may ensure unidirectional flow and/or isolated self-test capabilities for the safety contact, in particular for the safety line state detector.

However, the present invention also concerns a bidirectional safety contact comprising a safety contact according to the present invention, the safety contact comprising the controller, the safety line state detector and the safety switch circuit as discussed previously, wherein the safety line state detector will be termed the left-to-right (L2R) safety line state detector and the safety switch circuit will be termed the left-to-right (L2R) safety switch circuit within the context of this bidirectional safety contact. This bidirectional safety contact further comprises a right-to-left (R2L) safety line state detector and a right-to-left (R2L) safety switch circuit. Hereby, the input of the L2R safety line state detector is connected to the output of the R2L safety switch circuit and the output of the L2R safety switch circuit is connected to the input of the R2L safety line state detector. Furthermore, the R2L safety line state detector is operably connected to the controller via an R2L control signal output. This R2L safety line state detector is configured to provide the controller with an R2L control signal representing a safety line state which is dependent on the safety line input signal received at the input of the R2L safety line state detector. The R2L safety switch circuit comprises a set of at least one safety switch, the safety switch being positioned between a power supply and an R2L output.

The controller is configured to detect an active safety line operation direction during a safety line direction detection phase, and, on the basis of the detected safety line operation direction, to:

link the L2R safety line state detector and the L2R safety switch circuit within the safety line and disconnect the R2L safety line state detector and the R2L safety switch circuit from the safety line, or link the R2L safety line state detector and the R2L safety switch circuit within the safety line and disconnect the L2R safety line state detector and the L2R safety switch circuit from the safety line, thereby obtaining a linked safety line state detector and a linked safety switch circuit. The controller is further configured for the linked safety line state detector and the linked safety switch circuit, preferably during an operational phase of the safety contact, to:

upon receiving a control signal indicating a working safety line state and a sensor input value representing no safety function failure, close the safety switch of the linked safety switch circuit, thereby putting an output signal on the output of the linked safety switch circuit, the output signal indicating a working safety line state, and upon receiving a control signal indicating a non-working safety line state or a sensor input value representing a safety function failure, open said safety switch of the safety line circuit, thereby essentially interrupting the safety line.

Hence, when the safety switch of the linked safety switch is closed, the output of the linked safety switch circuit is essentially connected to the power supply, thus putting an output signal on the output indicating a working safety line state.

Linking a safety line state detector and a safety switch circuit in the safety line refers to configuring the controller to use this safety line state detector and this safety switch for any input and output signals concerned with driving the safety switches during an operational phase. Disconnecting a safety line state detector and a safety switch circuit from the safety line refers to configuring the controller to not use this safety line state detector and this safety switch for any input and output signals concerned with driving the safety switches.

For bidirectional safety contacts, as described above and further in this document, the safety line operation direction is detected during a safety line detection phase which is different from an operational phase of the safety contact during which the safety contact is configured to close the safety switch upon receiving a control signal indicating a working safety line state and a sensor input value representing no safety function failure and to open the safety switch upon a non-working safety line state or a sensor input value representing a safety function failure. During an operational phase, and while the control signal indicates a working safety line state and the sensor input value represents no safety function failure, it may be difficult to detect the safety line operation direction because the difference of the signal, typically the voltage, between the input and the output may be very small.

Preferably for a bidirectional contact, safety line direction detection comprises monitoring a first signal at the input of the L2R safety line state detector, which is connected to the output of the R2L safety switch circuit, and a second signal at the output of the L2R safety switch circuit, which is connected to the input of the R2L safety line state detector. The difference in signal can hereby be indicative of the safety line operation direction. Hence, the controller is preferably configured to monitor a first signal at the input of the L2R safety line state detector, which is connected to the output of the R2L safety switch circuit, and a second signal at the output of the L2R safety switch circuit, which is connected to the input of the R2L safety line state detector and to detect an active safety line operation direction on the basis of said first signal and said second signal, preferably on the basis of the difference thereof.

It should be noted that detecting the safety line operation direction was not necessary in prior art safety line setups wherein bidirectional relays were used as safety switches. Hence, in the present invention, preferably the safety switch, and more preferably each safety switch, is a unidirectional safety switch.

Furthermore, the present invention relates in a further aspect to a bidirectional safety contact comprising a controller which is configured for performing a safety line operation direction detection method, the bidirectional safety contact comprising a first input/output (I/O) contact and a second I/O contact, the first and second I/O contacts configured to allow insertion of the bidirectional safety contact in series in a safety line, said safety line operation direction detection method comprising the steps of:

- monitoring a first signal at the first I/O contact and a second signal at the second I/O contact, and
- detecting the safety line operation direction from a difference between the first signal and the second signal, whereby the controller is further configured to set the bidirectional safety contact to an active safety line operation direction, thereby effectively turning the bidirectional safety contact into a unidirectional safety contact. The controller is hereby preferably configured to perform the safety line operation direction detection method during a safety line direction detection phase. The safety line direction detection phase ends when the controller sets the bidirectional safety contact to the active safety line operation direction, after which an operational phase of the safety contact begins.

OVERVIEW OF THE FIGURES

DETAILED DESCRIPTION OF THE INVENTION

The invention will now be described in more detail, with reference to the figures.

Figure 1A:
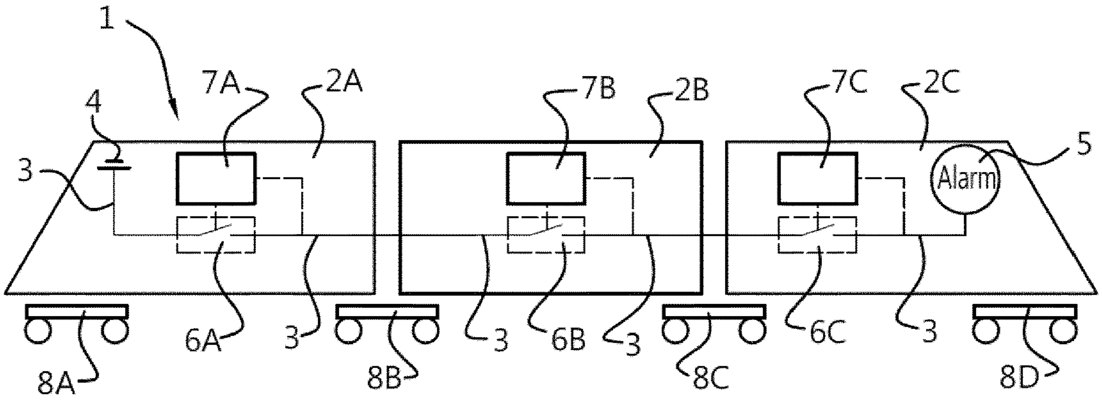
FIG. 1A illustrates the outline of a train comprising a number of carriages, equipped with a safety line system comprising a safety line with safety contacts in accordance with the present invention.

FIG. 1 illustrates the outline of a train (1) comprising a number of carriages, in particular three carriages (2A-C). The train is equipped with a safety line system comprising a safety line (3) running throughout the train. In the shown example, the safety line (3) is supplied with power from a power supply (4), such as preferably a DC voltage power supply of preferably between 20V and 240V, e.g. a 24V, a 48V or a 110V battery, which power supply can typically be located in the back carriage (2A) and is connected to an alarm indicator (5) in the front carriage (2C) where it can be monitored by a train driver. Typically, each carriage is provided with one or more safety contacts (6A-C), each safety contact being connected to one or more sensors (7A-C). Note that in the figure, one safety contact is provided on each carriage, but more typically each vehicle comprises multiple safety contacts in series in the safety line, for instance:

- each door can be provided with one or more safety contacts in order to give an alarm when a door does not close completely. The doors are then provided with specific sensors giving an error signal or an all-fine signal to the safety contact depending on the state of the door.
- each bogie (8A-D) can be provided with one or more safety contacts in order to give an alarm when an error is received from a bogie sensor, e.g. a sensor comprising a set of accelerometers giving an error signal to the safety contact if any measured accelerations are above a certain threshold.

Figure 1B:
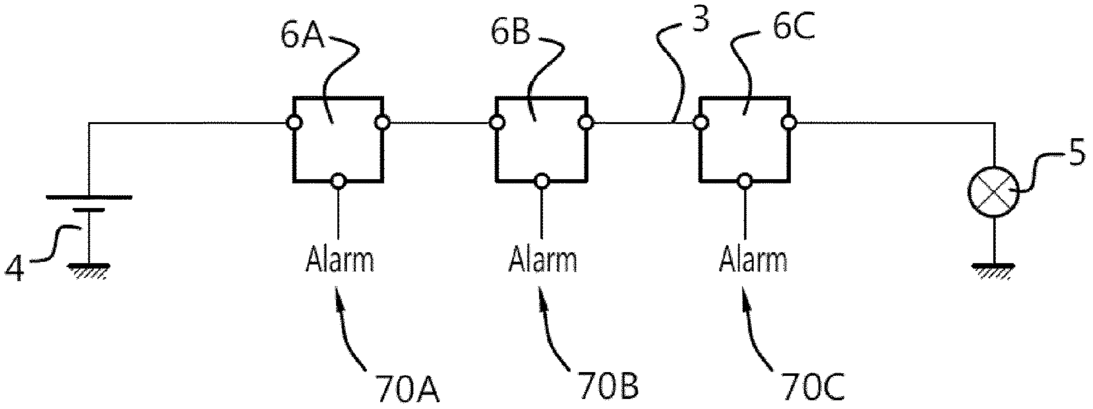
FIG. 1B illustrates a schematic outline of a safety line for a train.

It should be noted that the safety line is typically used for checking the proper functioning of critical components of the train, i.e. typically components which are critical for ensuring safety of passengers or goods. As illustrated in FIG. 1, each safety contact is capable of interrupting the safety line, whereby the alarm (5) in the front carriage is configured to go off in case the safety line is interrupted. This is illustrated in FIG. 1B, which shows a schematic outline of the safety line system, wherein the safety line comprises a set of safety contacts (6A-C) in series, each of which can receive an alarm signal (70A-C) which lead to an interruption of the safety line (3). As a result of the safety line interruption the alarm indicator (5) may notify the driver of a critical problem.

Note that, in general, it may not be known which carriage will serve as the active cab of the train. Moreover, a train may comprise a number of consists, each consist comprising a number of carriage. Typically the active cab will be a carriage at the end of a consist. Hence, preferably every carriage at the end of a consist is provided with a power supply (4), and with an alarm (5). Once the composition of the train is known, the active cab is known as well as the back carriage, i.e. the carriage at the opposite end of the active cab. Then, the alarm of the active cab and the power supply of the back carriage can be connected to the safety line.

Figure 1C:
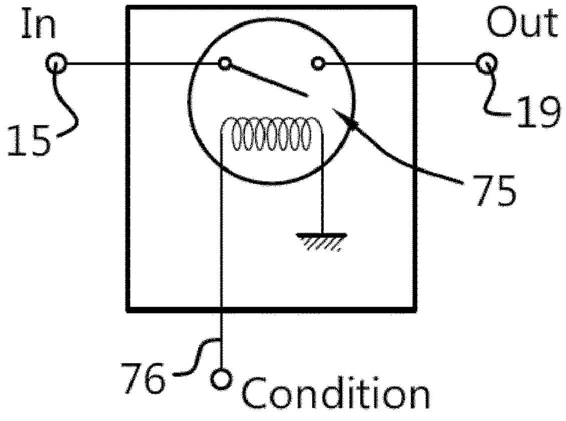
FIG. 1C illustrates a prior art safety contact.

FIG. 1C illustrates a typically prior art safety contact which can be connected in series via a first input/output (I/O) contact (15) and a second I/O contact (19). The prior art safety contact uses a relay safety switch (75) which allows contactless closing and interrupting of the safety line on the basis of a safety function input signal (76). The safety contact is bidirectional, i.e. first and second I/O can be interchanged. However, the prior art safety contact does not have a self-testing capability, and is based on a relay, having moving parts, which is prone to e.g. vibrations.

Figure 2A:
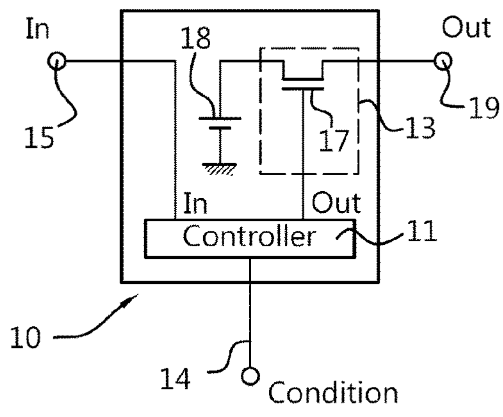
FIGS. 2A, 2B and 2C illustrate a safety contact according to embodiments of the present invention.
Figure 2B:
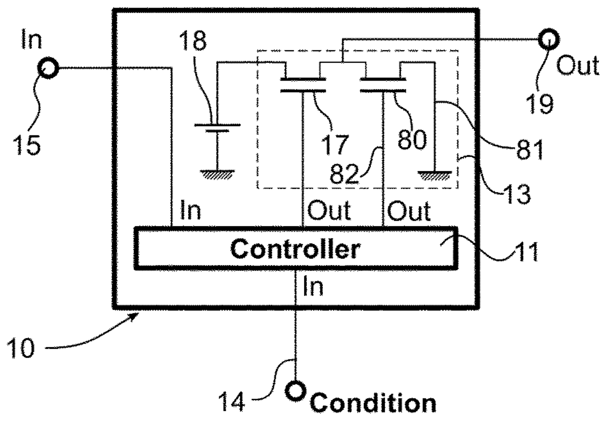
Figure 2C:
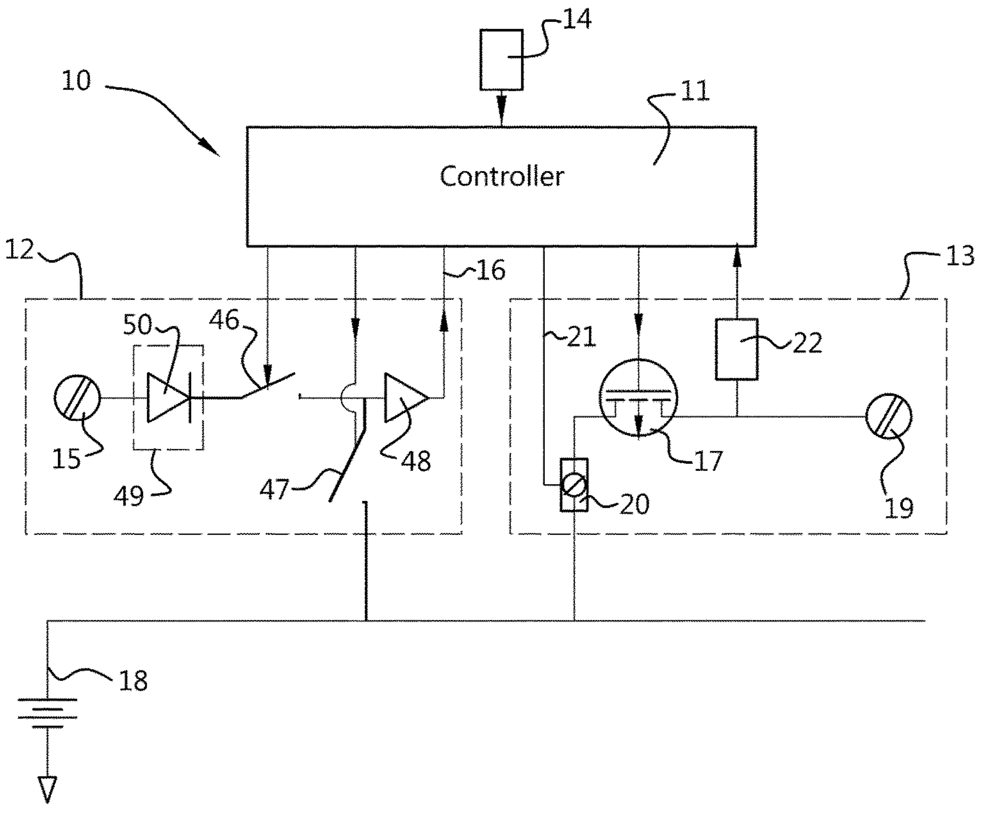

FIGS. 2A, 2B and 2C illustrate embodiments of an emulated voltage free safety contact according to the present invention. As discussed above, the present invention relates to an emulated voltage free safety contact (10) for a safety line (3) in a train (1), the emulated voltage free safety contact (10) comprising a controller (11), a safety line state detector (12), and a safety switch circuit (13). The safety line state detector may be incorporated into the controller or, as shown in FIG. 2C, the safety line state detector may comprise circuitry in between the input and the controller. The controller (10) comprises a sensor input (14) for receiving signals indicating failure or proper functioning of a critical component of the train. The safety line state detector (12) comprises an input (15) for a safety line input signal, and preferably is operably connected to the controller (11) via a control signal output (16). This safety line state detector (12) is configured to provide the controller (11) with a control signal representing a safety line state which is dependent on the safety line input signal received at the input (15). The safety switch circuit (13) comprises a set of at least one safety switch (17), the safety switch (17) being positioned between a power supply (18) and an output (19). The controller (11) is configured to:

- upon receiving a control signal indicating a working safety line state and a sensor input value representing no safety function failure, close said safety switch (17) of the safety switch circuit (13), thereby putting an output signal on the output (19), the output signal indicating a working safety line state, and
- upon receiving a control signal indicating a non-working safety line state or a sensor input value representing a safety function failure, open said safety switch (17) of the safety switch circuit, thereby essentially interrupting the safety line.

Preferably the safety switch (17) is open unless actively closed by the control signal.

Because the output (19) of the safety switch circuit (13) is connected via the safety switch (17) to the power supply (18) in case of a working safety line state, there are no additive voltage drops when using many safety contacts in series on the safety line, i.e. the output signal for each safety contact in the safety line is typically the voltage provided by the power supply, with only a small voltage drop due to a single safety switch circuit (13) and therefore does not degrade with additional safety switches (6A-C) connected in series.

In an embodiment of the invention, as illustrated in FIG. 2B, the safety switch circuit comprises an output pull-down subcircuit configured for actively pulling down the output signal on the output (19) of the safety switch circuit (13). Preferably hereby, the controller is configured to actively put an output signal on the output (19) which is indicative of a non-working safety line state if the safety switch (17) is open. In a preferred embodiment, the output pull-down subcircuit comprises a pull-down switch (80) placed between the output (19) and a non-working safety line state signal generating component (81), which preferably is a ground as shown in FIG. 2B. The pull-down switch (80) is controlled (82) by the controller. Hereby, when the safety switch (17) is closed, the pull-down switch is open, allowing the safety switch to pass through a working-state signal to the next safety switch, and when the safety switch is open, e.g. because of an unsafe condition or because the safety line being in a non-working state, the pull-down switch can be closed by the controller to ensure an output signal which is indicative of a non-working safety line state to be sent to the next safety switch.

In an embodiment of the invention, the safety switch circuit (13) comprises a current sensor (20) between the power supply (18) and the safety switch (17), the current sensor (20) being operably connected (21) to the controller (11). Hereby, the controller (11) is configured to interrupt the safety switch (17) upon receiving a signal from the current sensor (21) indicative of an over-current. Preferably, the controller (11) is configured to interrupt the safety switch (17) if the signal from the current sensor (20) indicates that the current is larger than a pre-set current threshold. The presence of a current sensor (20) basically protects the one or more switches in the safety switch circuit against current surges.

The controller may preferably comprise a discrete logic circuitry, a programmable logic component, a field programmable gate array, a CPLD, a microcontroller and/or any combination thereof.

In an embodiment of the invention, the safety switch circuit (13) comprises a feedback logic circuit (22) connected between the output (19) of the safety switch circuit (13) and the controller (11) for providing the controller (11) with a signal indicative of the output signal. This feedback logic circuit (22) allows the controller (11) to check if the output signal corresponds with the state of the safety switch (17) controlled by the controller (11), i.e. if the controller has closed the safety switch, it can check via the feedback logic circuit that the output signal indeed corresponds to a closed safety switch, and thus to a working safety line state, while if the controller has opened the safety switch, it can check via the feedback logic circuit that the output signal indeed is zero, as it should be for an open safety switch. Hereby, if the controller (11) detects a discrepancy between the measured output signal and the expected output signal, the controller (11) is preferably configured to open the safety switch (17) and notify a central train controller of the occurrence of said discrepancy. As such, the controller (11) comprises a self-testing capability.

Figure 3:
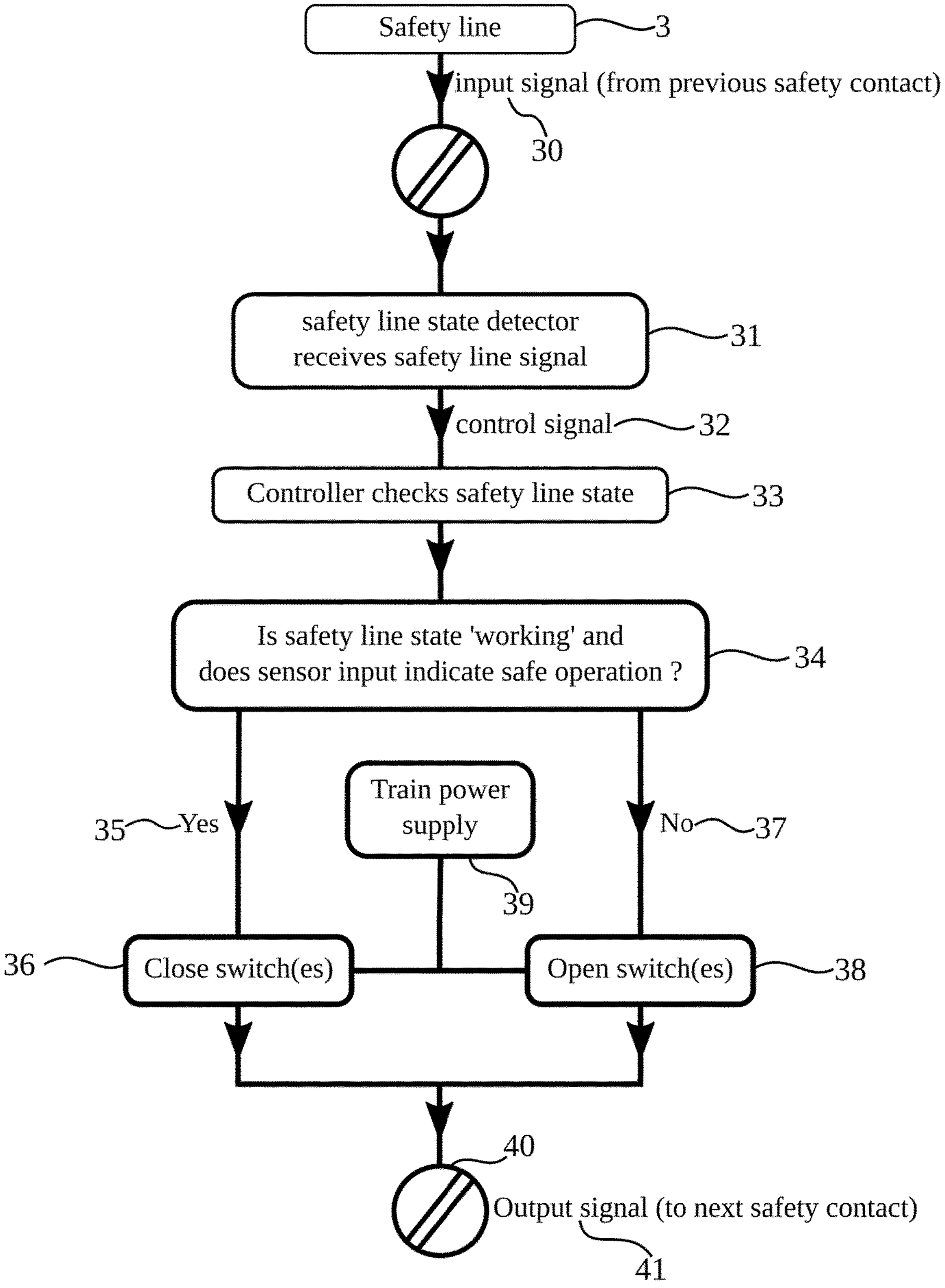
FIG. 3 illustrates operational workflow for the safety contact according to an embodiment of the present invention.

The operation of the safety contact is outlined in the flowchart of FIG. 3. The safety line (3) provides an input signal (30) which typically comes from the output of a previous safety contact. The input signal is received by the safety line state detector (31), which is configured to send a control signal (32) to the controller, the control signal indicative of the safety line state. The controller then checks the safety line state (33) on the basis of the received control signal. The controller then checks if the safety line is in a working state and if the sensor input value indicates safe operation (34). If the safety line state refers to a working state and the sensor input value refers to no safety risk (35), the controller closes the safety switch (36) in the safety switch circuit, thereby connecting the train's power supply (39) to the output (40) which thus sends an output signal (41), typically to the next safety contact on the safety line, the output signal indicative of a working safety line state. If the safety line refers to an open state or if the sensor input value refers to a safety risk, the safety switch is opened (38), disconnecting the train's power supply (39) from the output (40), thereby sending an output signal which is indicative of a non-working safety line state, and which output signal is typically a zero signal.

Figure 4:
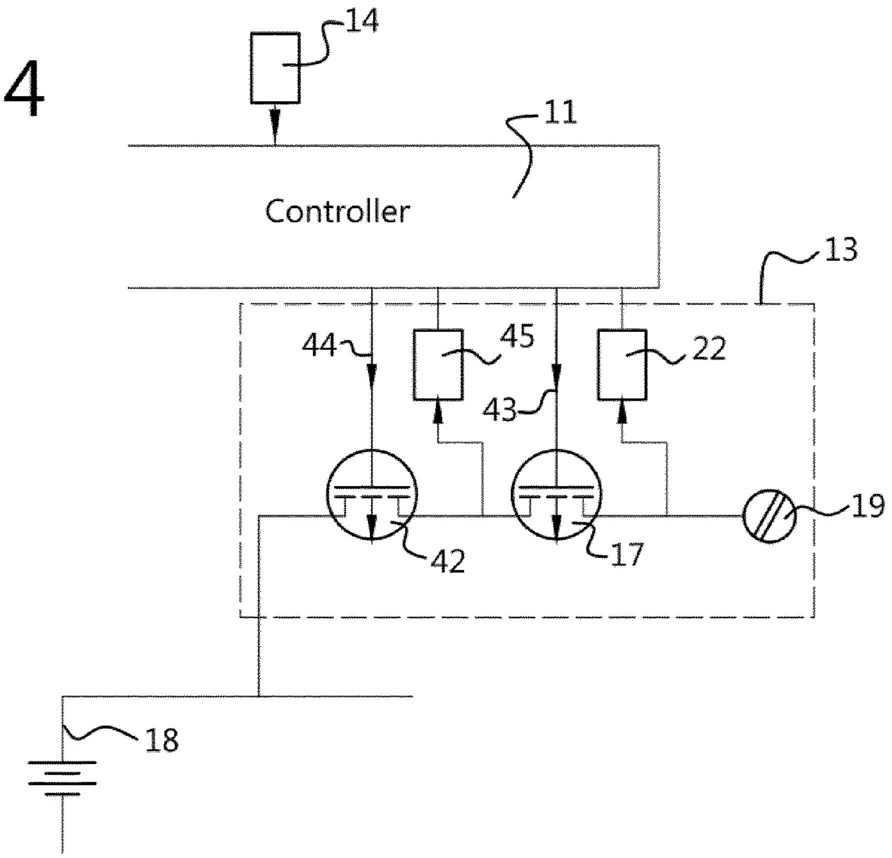
FIG. 4 illustrates a safety switch circuit of a safety contact in accordance with an embodiment of the present invention.

FIG. 4 shows a safety switch circuit in accordance with an embodiment of the present invention. In this embodiment, wherein the safety switch circuit (13) comprises at least two safety switches (17, 42) in series between the power supply (18) and the output (19). Each of the at least two safety switches (17, 42) is operably connected (43, 44) to the controller (11), whereby the controller (11) is configured, to:

- upon receiving a control signal indicating a working safety line state and a sensor input value representing no safety function failure, close each safety switch (17, 42) of the safety switch circuit (13), thereby putting an output signal on the output (19), the output signal indicating a working safety line state, and
- upon receiving a control signal indicating a non-working safety line state or a sensor input value representing a safety function failure, open each safety switch (17, 42) of the safety line circuit (13), thereby essentially interrupting the safety line.

The presence of two safety switches (17, 42), and optionally even more than two safety switches in series, reduces the risk of a dangerously non functional safety switch through the failure of a safety contact. For instance, a single point of failure such as a short circuited switch, does not lead to a failing safety contact. In a particularly preferred embodiment, the safety switch circuits (17, 42) comprises a feedback logic circuit (22, 45) for each of the at least two safety switches, each feedback logic circuit (22, 45) operably connected to the controller (11), for providing the controller with a signal indicative of the signal on the safety line after each safety switch (17, 42). As such, the controller is allowed to, and preferably is configured to, check after each safety switch, if the signal on the safety line corresponds to the expected signal. Hereby, in case of failure of one of the safety switches, the controller is capable of identifying which safety switch is failing.

Figure 5:
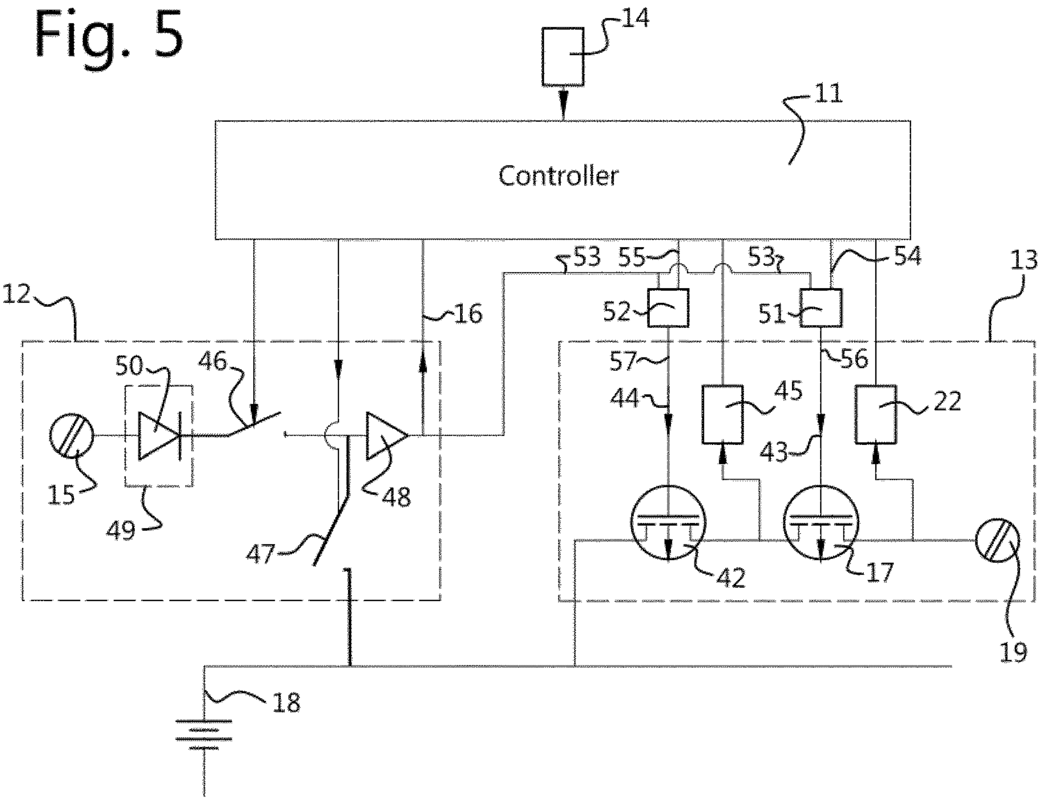
FIG. 5 illustrates a safety contact according to a particularly preferred embodiment of the present invention.

FIG. 5 illustrates an emulated voltage free safety contact with the safety switch circuit of FIG. 4. In a preferred embodiment of the invention, the safety switch circuit (13) comprises at least two safety switches (17, 42) in series between the power supply (18) and the output (19). Each of the at least two safety switches (17, 42) is operably connected (43, 44) to the controller (11), whereby the controller (11) is configured, to:

- upon receiving a control signal indicating a working safety line state and a sensor input value representing no (safety) function failure, close each safety switch (17, 42) of the safety switch circuit (13), thereby putting an output signal on the output (19), the output signal indicating a working safety line state, and
- upon receiving a control signal indicating a non-working safety line state or a sensor input value representing a (safety) function failure, open each safety switch (17, 42) of the safety line circuit (13), thereby essentially interrupting the safety line.

The presence of two safety switches (17, 42), and optionally even more than two safety switches in series, reduces the risk of a dangerously non functional safety switch through the failure of a safety contact. For instance, a single point of failure such as a short circuited switch, does not lead to a failing safety contact. In a particularly preferred embodiment, the safety switch circuits (17, 42) comprises a feedback logic circuit (22, 45) for each of the at least two safety switches, each feedback logic circuit (22, 45) operably connected to the controller (11), for providing the controller with a signal indicative of the signal on the safety line after each safety switch (17, 42). As such, the controller is allowed to, and preferably is configured to, check after each safety switch, if the signal on the safety line corresponds to the expected signal. Hereby, in case of failure of one of the safety switches, the controller is capable of identifying which safety switch is failing.

The controller (11) may open and close the one or more safety switches (17, 42) by sending a switch control signal. The exact form of the switch control signal depends on the nature of the one or more safety switches. Preferably the one, two or more safety switches do not have moving parts, preferably the safety switches are solid state switches, more preferably electronic switches, still more preferably purely electronic switches, such as transistors, more preferably MOSFET switches and/or bipolar switches, more preferably MOSFET power switches, such as pMOS and/or nMOS power switches. Solid state switches are particularly preferred because they are vibration insensitive, which makes them possible to install and use on high-vibration train components such as bogies. Furthermore, purely electronic switches are preferred to switches such as the opto-electronic switches in document WO 2010/031570 A1, because purely electronic switches comprise lower impedance.

In a preferred embodiment of the invention, the safety line state detector (12) comprises self-testing capability. Preferably hereby, and with reference to the figures, the safety line state detector (12) comprises an active testing switch (47) and/or an inactive testing switch (46). Preferably the active testing switch (47) and/or the inactive testing switch (46) are electronic switches, such as transistors, more preferably MOSFET switches and/or bipolar switches, more preferably MOSFET power switches, such as pMOS and/or nMOS power switches. In a particularly preferred embodiment, the active testing switch (47) and/or the inactive testing switch (46) implemented in the same technology as the safety switches (14, 42). Thus preferably, the one, two or more safety switches, the active testing switch (47) and the inactive testing switch (46) are each an electronic switch, such as a transistor, more preferably a MOSFET switch or a bipolar switch, more preferably a MOSFET power switch, such as a pMOS or an nMOS power switch.

The inactive testing switch (46) is positioned in series between the input (15) of the emulator (12) and the control signal output (16) and is thus configured to disconnect the input (15) from the control signal output (16) if the inactive testing switch (46) is opened. The active testing switch (47) is positioned between the power supply (18) and the control signal output (16) and is thus configured to provide a power input to the control signal output (16), independent of the input signal at the input (15). The inactive testing switch (46) and/or active testing switch (47) allow testing of the input and input signal.

The inactive testing switch (46) and/or the active testing switch (47) are controlled by the controller (11). During an operational phase of the safety line (3), the inactive testing switch (46) is closed and the active testing switch is open (47), allowing to send a control signal on the basis of the safety line input signal to the controller (11). Preferably the controller (11) is configured to test the safety contact, and preferably the line state detector (12), for failure during a testing phase at certain moments, e.g. at start-up and/or on regular intervals. The controller (11) is hereby preferably configured to:

- open the inactive testing switch (46) and open the active testing switch (47), thereby checking that the control signal at the control signal output (16) is indicative of the absence of a safety line input signal. This allows the controller to check for leakages and/or short circuits in the system, resulting in an incorrect active output control signal (16).
- open the inactive testing switch (46) and close the active testing switch (47), thereby essentially connecting the power supply (18) to the control signal output (16), thereby essentially determining the control signal by the power supply. This allows the controller to check if the safety line state detector circuit is correctly informing the controller (11) of a active safety line via output control signal (16).

In a preferred embodiment, the safety line state detector (12) comprises a logic level convertor (48) positioned in series between the input (15) and the control signal output (16), and preferably between the active and/or inactive switches (46, 47) on the one side and the controller output (16) on the other side. The logic level convertor (48) is configured to transform a power supply voltage level to a controller voltage level.

In a preferred embodiment, the safety line state detector (12) comprises a leaking protection subcircuit (49) between the input (15) and other electronic components (46, 47, 48) of the safety line state detector (12) to protect the input (15) from leaking test voltages out of the input. Preferably, the leakage protection subcircuit (49) comprises a diode (50) positioned between the input (15) and the other electronic components of the safety line state detector (12).

In a preferred embodiment and with reference to FIG. 5, the safety contact comprises a logic safe-guard circuit (51) configured to take as input the control signal (53) from the safety line state detector (12) and the switch control signal (54) for the safety switch (17) coming from the controller (11). This to provide as output, a safe-guarded switch control signal (56) to the safety switch (17). The logic safe-guard circuit (51) is hereby configured to pass through the switch control signal (54) from the controller only if the control signal (53) from the safety line state detector (12) is high, i.e. when the safety line is in a working state. The logic safe-guard circuit (51) thus essentially acts as a logic AND gate providing a safe-guarded switch control signal (56) to the safety switch (17) in case both the safety line is in a working state and the controller indicates that the safety switch can be closed, e.g. because the sensor input of the controller does not indicate a problem and the controller has not found any discrepancies during a testing phase.

Preferably, in the case the safety switch circuit (13) comprises at least two safety switches (17, 42), as is shown in FIG. 5, the safety contact comprises at least two logic safe-guard circuits (51, 52), preferably a logic safe-guard circuit for each safety switch (51 for 17, 52 for 42). Each logic safe-guard circuit (51, 52) is configured to take as input the control signal (53) from the safety line state detector (12) and the switch control signal (54, 55) for the respective safety switch (17, 42) coming from the controller (11), and to provide as output a safe-guarded switch control signal (56, 57) to the respective safety switch (17, 42).

In an embodiment, the safety contact is uni-directional as shown in FIG. 5. However, in a preferred embodiment, the safety contact is bi-directional. In case the safety contact of the present invention is implanted in a safety line, e.g. of a train, it may not be certain up front in which direction the safety line is configured to run. In such cases it is preferred to use a bidirectional safety contact.

In an embodiment, a bidirectional safety contact may comprise two unidirectional safety contacts, one arranged for each direction. Hereby, the safety contacts may be implemented separated. The safety contacts may hereby also preferably comprise a unidirectional pass-through subcircuit at the input of the safety line state detector and/or at the output of the safety switch circuit, to ensure unidirectional flow.

Figure 6:
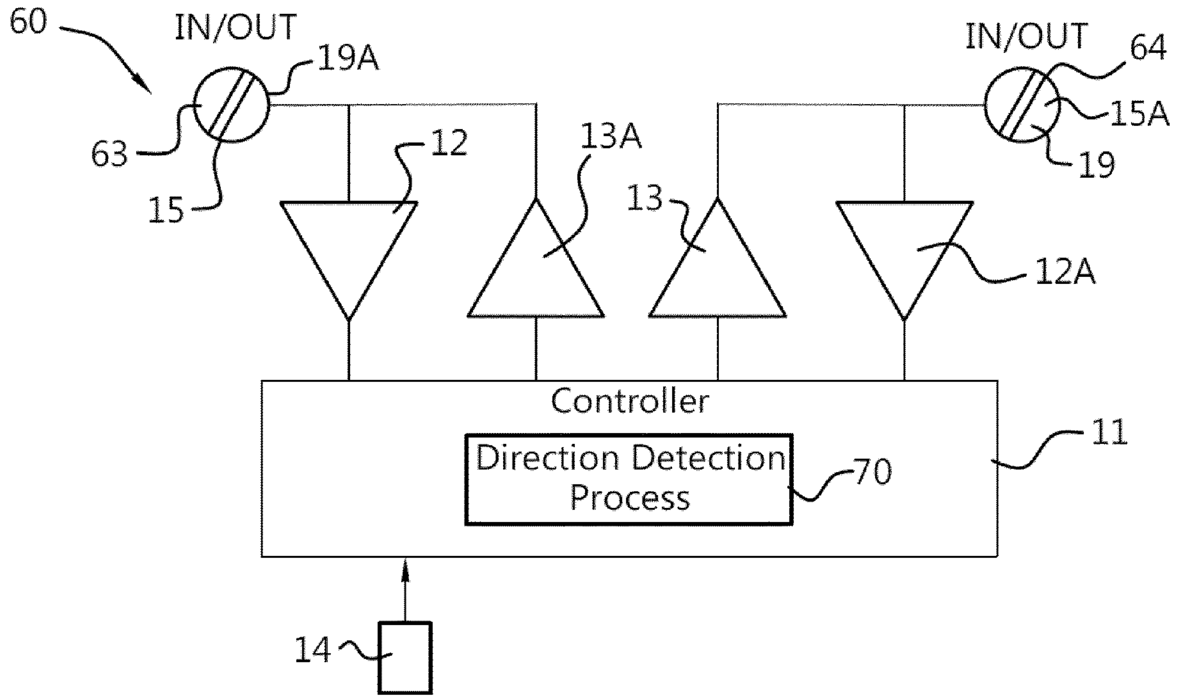
FIG. 6 illustrates a schematic of a bidirectional safety contact in accordance with an embodiment of the invention.
Figure 7:
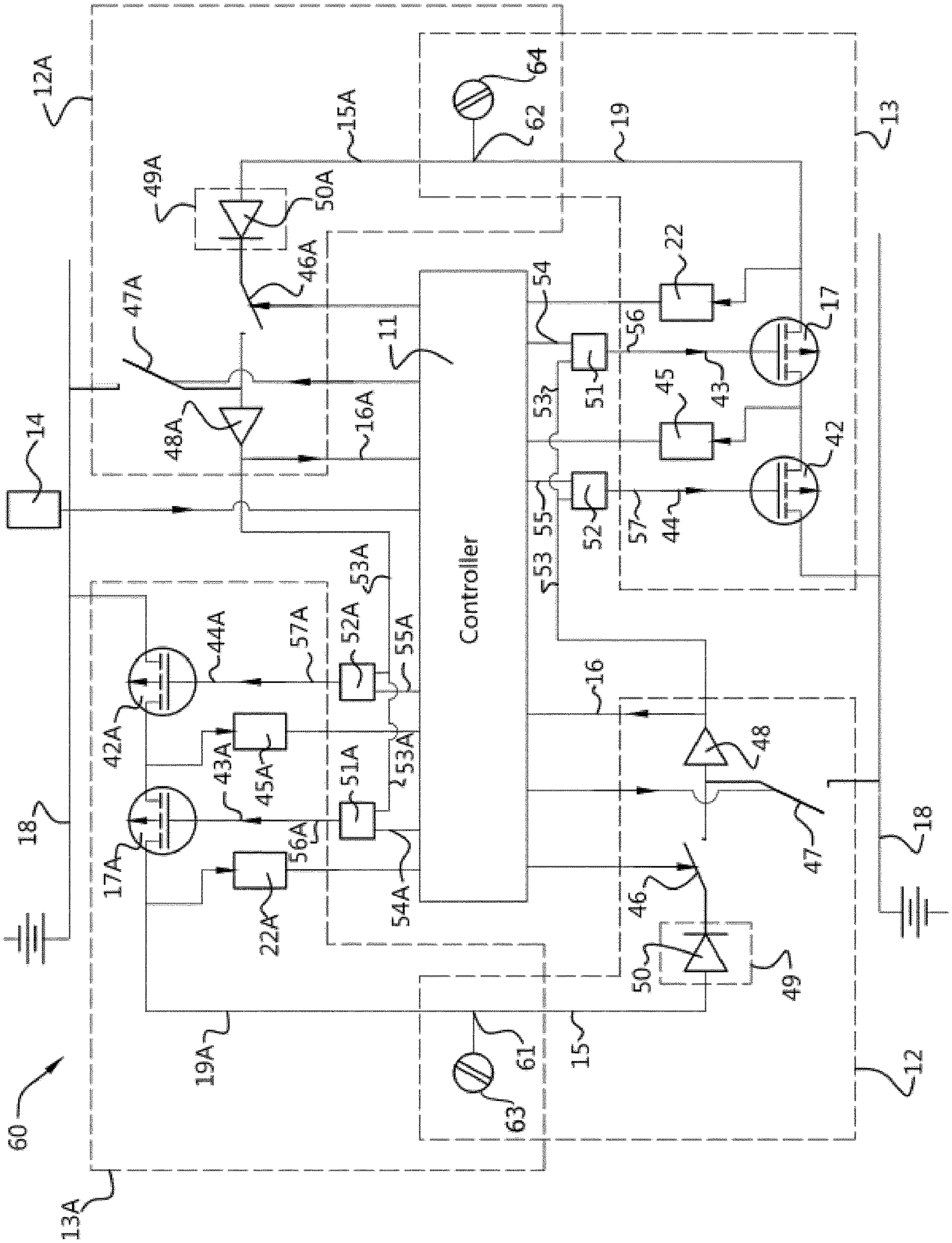
FIG. 7 illustrates a bidirectional safety contact according to a particularly preferred embodiment of the present invention.
Figure 8:
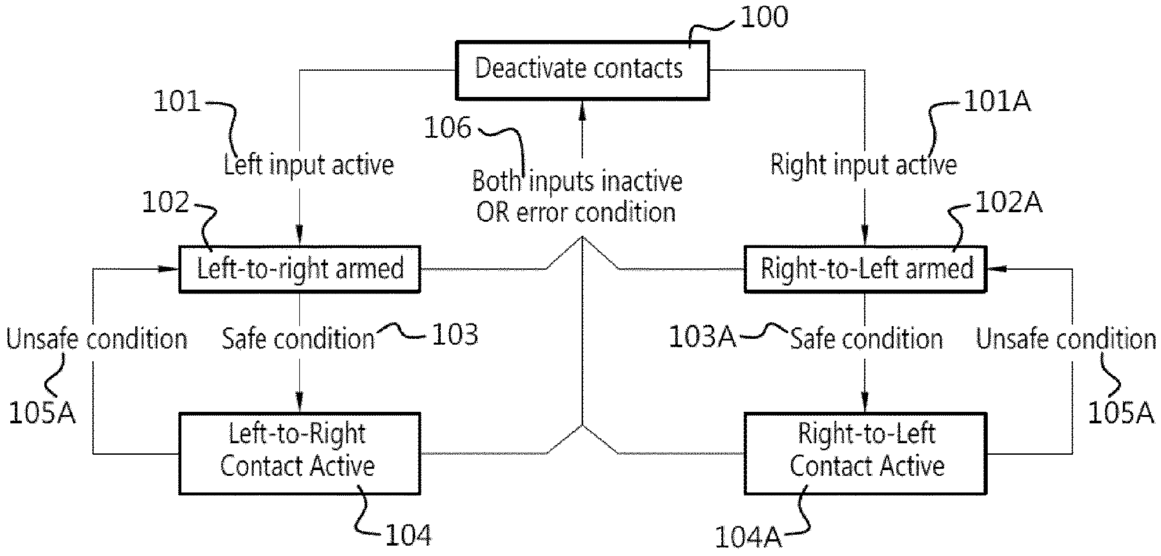
FIG. 8 illustrates operational workflow for a bidirectional safety contact according to an embodiment of the present invention.

However, the present invention also concerns a bidirectional safety contact (60) comprising a safety contact according to the present invention and as illustrated in FIGS. 6, 7 and 8, the bidirectional safety contact (60) comprising the controller (11), the safety line state detector (12) and the safety switch circuit (13) as discussed previously, wherein the safety line state detector (12) will be termed the left-to-right (L2R) safety line state detector (12) and the safety switch circuit (13) will be termed the left-to-right (L2R) safety switch circuit (13) within the context of this bidirectional safety contact (60). This bidirectional safety contact (60) further comprises a right-to-left (R2L) safety line state detector (12A) and a right-to-left (R2L) safety switch circuit (13A). Hereby, the input (15) of the L2R safety line state detector (12) is connected (61) to the output (19A) of the R2L safety switch circuit (13A) and the output (19) of the L2R safety switch circuit (13) is connected (62) to the input (15A) of the R2L safety line state detector (12A). Preferably, the input (15) of the L2R safety line state detector (12) is joined with the output (19A) of the R2L safety switch circuit (13A) in a common first input/output contact (63) and/or the output (19) of the L2R safety switch circuit (13) is joined with the input (15A) of the R2L safety line state detector (12A) in a common second input/output contact (64). Furthermore, the R2L safety line state detector (12A) is operably connected to the controller (11) via an R2L control signal output (16A). This R2L safety line state detector (12A) is configured to provide the controller (11) with an R2L control signal representing a safety line state which is dependent on the safety line input signal received at the input (15A, 64) of the R2L safety line state detector (12A). The R2L safety switch circuit (13A) comprises a set of at least one safety switch (17A), preferably at least two safety switches (17A, 42A), these one or more switches being positioned in series between a power supply (18) and an R2L output (19A). Preferably, the power supply (18) is common to both L2R and R2L emulators (12, 12A) and safety switch circuits (13, 13A). The controller (11) is configured to, during a safety line direction detection phase, detect a safety line direction (70), and on the basis of the detected safety line direction, link the L2R safety line state detector (12) and the L2R safety switch circuit (13) within the safety line (3) and disconnect the R2L safety line state detector (12A) and the R2L safety switch circuit (13A) from the safety line (3) or link the R2L safety line state detector (12A) and the R2L safety switch circuit (13A) within the safety line (3) and disconnect the L2R safety line state detector (12) and the L2R safety switch circuit (13) from the safety line (3), thereby obtaining a linked safety line state detector and a linked safety switch circuit. The controller is further configured for the linked safety line state detector and the linked safety switch circuit to:

upon receiving a control signal indicating a working safety line state and a sensor input value representing no safety function failure, close the safety switch of the linked safety switch circuit, thereby putting an output signal on the output of the linked safety switch circuit, the output signal indicating a working safety line state, and upon receiving a control signal indicating a non-working safety line state or a sensor input value representing a safety function failure, open said safety switch of the safety line circuit, thereby essentially interrupting the safety line.

Linking a safety line state detector and a safety switch circuit in the safety line refers to configuring the controller to use this safety line state detector and this safety switch for any input and output signals concerned with driving the safety switches. Disconnecting a safety line state detector and a safety switch circuit from the safety line refers to configuring the controller to not use this safety line state detector and this safety switch for any input and output signals concerned with driving the safety switches. Disconnecting may preferably be achieved by opening at least one, and preferably each of the safety switches of the disconnected safety switch circuit, and/or by opening at least one, and preferably each of testing switches, such as the active testing switch and/or the inactive testing switch, of the disconnected safety line state detector. Alternatively or additionally, disconnecting may preferably be achieved by the controller being configured to ignore signals from the disconnected safety line state detector and/or the disconnected safety switch circuit.

The methodology for deciding upon the direction of flow, is illustrated in the flow chart of FIG. 8. Initially, e.g. at start up, the bidirectional safety contacts of a safety line are deactivated (100), by interrupting the safety switches. Then each bidirectional contact monitors the input/output contacts (63, 64). As soon as one of these input/output contacts becomes active (101, 101A), the controller of the safety contact can decide upon the direction of the safety contact, and can link the appropriate components, i.e. it arms the L2R components if the L2R input is active (102) or the R2L components if the R2L input is active. At that moment, the bidirectional safety contact performs its operations as if it were a unidirectional contact, i.e. it may perform safety checks (103, 103A), such as a self-testing check as previously described, and sets the safety contact to a working state (104, 104A). If the safety checks are no longer fulfilled, e.g. if the sensor provides an input indicating a failure, the controller transitions (105, 105A) to the armed state where the components for the active direction are activated but the contacts are switched off. If in any operational state (102, 102A, 104, 104A) the controller detects the that the active safety line state detector is no longer indicating an active safety line, the controller transitions (106) back to the deactivated state (100).

It is understood that the terms left-to-right (L2R) and right-to-left (R2L) are used to distinguish between the two possible directions in which a safety line can be operated, and do not necessarily indicate the actual directions in space. The terms are merely coined this way in order to correspond to the directions in the figures for ease of explanation.

In a preferred embodiment, the controller comprises a field-programmable gate array (FPGA), a complex programmable logic device (CPLD), an application-specific integrated circuit (ASIC) and/or a processing unit, such as a central processing unit (CPU), most preferably the controller comprises or is implemented in a field-programmable array.

It is understood that the different embodiments described above with respect to more specific implementations of the invention, in particular related to the safety line state detector, the safety switch circuit, the logic safe-guard circuit, etc. can also be implemented in the bidirectional safety contact according to the present invention. For instance, the embodiment wherein the safety switch circuit comprises at least two safety switches in series in the safety line can be applied to the bidirectional safety contact whereby the LR2 safety switch circuit and/or the R2L safety switch circuit comprises at least two safety switches. Further, FIG. 7 indicates R2L counterparts to L2R components by using the same reference number with an additional “A” indication, for instance the safety switches are indicated in the L2R portion of the bidirectional safety contact with (17) and (42), and in the R2L portion of the bidirectional safety contact with (17A) and (42A).

The invention claimed is:

1. A safety contact for a safety line in a train, the safety contact comprising a controller and a safety switch circuit, wherein the controller comprises a sensor input for receiving signals indicating failure, wherein the safety contact comprises an input for a safety line input signal, wherein the input is operably connected to the controller, wherein the controller is configured to receive a control signal representing a safety line state which is dependent on the safety line input signal received at the input, wherein the safety switch circuit comprises at least one safety switch, the at least one safety switch being positioned between a power supply and an output, wherein the controller is configured to:

in response to the control signal indicating a working safety line state and a first sensor input value representing no safety function failure, close said at least one safety switch of the safety switch circuit, thereby connecting the output of the safety switch circuit to the power supply, thus putting an output signal on the output, the output signal indicating the working safety line state, and in response to the control signal indicating a non-working safety line state or a second sensor input value representing a safety function failure, open said at least one safety switch of the safety switch circuit, thereby essentially interrupting the safety line.

2. The safety contact according to claim 1, further comprising a safety line state detector, wherein the safety line state detector comprises said input for the safety line input signal, and wherein the input is operably connected to the controller via the safety line state detector, wherein the safety line state detector comprises a control signal output, said safety line state detector being configured to provide the controller with the control signal via said control signal output representing the safety line state, the safety line state being dependent on the safety line input signal received at the input.

3. The safety contact according to claim 2, wherein the safety line state detector is comprised in the controller.

4. The safety contact according to claim 1, wherein the safety switch circuit comprises at least two safety switches in series between the power supply and the output, wherein each of the at least two safety switches is operably connected to the controller, and wherein:

closing said at least one safety switch of the safety switch circuit comprises closing each safety switch of the safety switch circuit, and opening said at least one safety switch of the safety switch circuit comprises opening each safety switch of the safety switch circuit.

5. The safety contact according to claim 1, wherein the safety switch circuit comprises a feedback logic circuit connected between the output of the safety switch circuit and the controller for providing the controller with a signal indicative of the output signal.

6. The safety contact according to claim 1, wherein the safety switch circuit comprises a current sensor between the power supply and the at least one safety switch, the current sensor being operably connected to the controller, wherein the controller is configured to interrupt the at least one safety switch in response to receiving a signal from the current sensor indicative of an over-current.

7. The safety contact according to claim 1, wherein the at least one safety switch does not have moving parts.

8. The safety contact according to claim 7, wherein the at least one safety switch comprises a MOSFET switch.

9. The safety contact according to claim 2, wherein the safety line state detector comprises:

an inactive testing switch, which is positioned in series between the input of the safety line state detector and the control signal output, and is configured to disconnect the input from the control signal output if the inactive testing switch is opened, and/or an active testing switch, which is positioned between the power supply and the control signal output and is thus configured to provide a power input to the control signal output, independent of an input signal at the input.

10. The safety contact according to claim 9, comprising said inactive testing switch and said active testing switch, wherein the controller is configured to test the safety contact for failure during a testing phase, the controller hereby configured to:

open the inactive testing switch and open the active testing switch, thereby checking that the control signal at the control signal output is indicative of an absence of the safety line input signal, and/or open the inactive testing switch and close the active testing switch, thereby essentially connecting the power supply to the control signal output, thereby checking if the safety line state detector is correctly informing the controller of an active safety line via output control signal.

11. The safety contact according to claim 2, wherein the safety line state detector comprises a logic level convertor positioned in series between the input and the control signal output, the logic level convertor being configured to transform a power supply voltage level to a controller voltage level.

12. The safety contact according to claim 2, wherein the safety line state detector comprises a leaking protection subcircuit between the input and other electronic components of the safety line state detector to protect the input from leaking test voltages out of the input.

13. The safety contact according to claim 2, wherein the safety contact comprises a logic safe-guard circuit configured to take as input the control signal from the safety line state detector and the control signal for the at least one safety switch coming from the controller, and to provide as output a safe-guarded switch control signal to the at least one safety switch, wherein the logic safe-guard circuit is configured to pass through the control signal from the controller only if the control signal from the safety line state detector indicates that the safety line is in a working state.

14. The safety contact according to claim 1, the safety contact being bidirectional.

15. The safety contact according to claim 2, the safety contact comprising the controller, wherein the safety line state is a first safety line state, and wherein the at least one safety switch is a first at least one safety switch, and wherein the output signal is a first output signal, and wherein the safety contact is bidirectional, and wherein the safety line state detector is a left-to-right (L2R) safety line state detector and the safety switch circuit is a left-to-right (L2R) safety switch circuit, and wherein the safety contact further comprises a right-to-left (R2L) safety line state detector and a right-to-left (R2L) safety switch circuit, wherein an input of the L2R safety line state detector is connected to an output of the R2L safety switch circuit and an output of the L2R safety switch circuit is connected to an input of the R2L safety line state detector, wherein the R2L safety line state detector is operably connected to the controller via an R2L control signal output, wherein the R2L safety line state detector is configured to provide the controller with an R2L control signal representing a second safety line state which is dependent on an R2L safety line input signal received at the input of the R2L safety line state detector, wherein the R2L safety switch circuit comprises a second at least one safety switch, the second at least one safety switch being positioned between the power supply and an R2L output, wherein the controller is further configured to, during a start-up phase, detect a process direction, and, based on the process direction:

link the L2R safety line state detector and the L2R safety switch circuit within the safety line and disconnect the R2L safety line state detector and the R2L safety switch circuit from the safety line, or link the R2L safety line state detector and the R2L safety switch circuit within the safety line and disconnect the L2R safety line state detector and the L2R safety switch circuit from the safety line, thereby obtaining a linked safety line state detector and a linked safety switch circuit, and wherein the controller is further configured to:

in response to the R2L control signal indicating the working safety line state and the first sensor input value representing no safety function failure, close the second at least one safety switch of the linked safety switch circuit, thereby connecting an output of the linked safety switch circuit to the power supply, thus putting a second output signal on the output of the linked safety switch circuit, the second output signal indicating the working safety line state, and in response to the R2L control signal indicating the non-working safety line state or the second sensor input value representing the safety function failure, open said second at least one safety switch of the linked safety switch circuit, thereby essentially interrupting the safety line.

16. The safety contact according to claim 2, wherein the safety switch circuit comprises at least two safety switches in series between the power supply and the output, wherein each of the at least two safety switches is operably connected to the controller, and wherein:

closing said at least one safety switch of the safety switch circuit comprises closing each safety switch of the safety switch circuit, and opening said at least one safety switch of the safety switch circuit comprises opening each safety switch of the safety switch circuit.

17. The safety contact according to claim 3, wherein the safety switch circuit comprises at least two safety switches in series between the power supply and the output, wherein each of the at least two safety switches is operably connected to the controller, and wherein:

closing said at least one safety switch of the safety switch circuit comprises closing each safety switch of the safety switch circuit, and opening said at least one safety switch of the safety switch circuit comprises opening each safety switch of the safety switch circuit.

18. The safety contact according to claim 2, wherein the safety switch circuit comprises a feedback logic circuit connected between the output of the safety switch circuit and the controller for providing the controller with a signal indicative of the output signal.

19. The safety contact according to claim 3, wherein the safety switch circuit comprises a feedback logic circuit connected between the output of the safety switch circuit and the controller for providing the controller with a signal indicative of the output signal.

20. The safety contact according to claim 4, wherein the safety switch circuit comprises a feedback logic circuit connected between the output of the safety switch circuit and the controller for providing the controller with a signal indicative of the output signal.

* * * * *